United States Patent [19]
Fukasawa et al.

[11] Patent Number: 5,715,521
[45] Date of Patent: Feb. 3, 1998

[54] METHOD OF CONTROLLING SYNCHRONIZATION SIGNAL POWER IN A COMMUNICATION SYSTEM

[75] Inventors: Atsushi Fukasawa; Toshio Kato; Takuro Sato; Manabu Kawabe, all of Tokyo, Japan

[73] Assignee: OKI Electric Industry Co., Ltd., Tokyo, Japan

[21] Appl. No.: 426,528

[22] Filed: Apr. 20, 1995

[30] Foreign Application Priority Data

Apr. 22, 1994 [JP] Japan .................................. 6-084644

[51] Int. Cl.⁶ .................................................. H04B 1/00
[52] U.S. Cl. .................. 455/69; 370/350; 370/507; 370/514; 375/297; 375/358; 375/359
[58] Field of Search .............................. 375/200, 202, 375/203, 206, 356, 358, 359, 362, 367, 297, 285, 296; 320/320, 342, 350, 515; 370/507, 514; 455/68, 69, 116, 127, 33.1

[56] References Cited

U.S. PATENT DOCUMENTS

| | | | |
|---|---|---|---|
| 4,777,653 | 10/1988 | Bonnerot et al. | 455/69 |
| 5,128,965 | 7/1992 | Henriksson | 375/58 |
| 5,164,958 | 11/1992 | Omura | 375/200 |
| 5,228,056 | 7/1993 | Schilling | 375/200 |
| 5,265,119 | 11/1993 | Gilhousen et al. | 375/200 |
| 5,267,262 | 11/1993 | Weatley, III | 375/200 |
| 5,299,226 | 3/1994 | Schiling | 375/200 |
| 5,465,399 | 11/1995 | Oberholzer et al. | 455/69 |
| 5,485,486 | 1/1996 | Gilhousen et al. | 375/200 |
| 5,535,238 | 7/1996 | Schilling et al. | 375/200 |
| 5,559,789 | 9/1996 | Nakano et al. | 370/18 |

*Primary Examiner*—Wellington Chin
*Assistant Examiner*—Jean B. Corrielus
*Attorney, Agent, or Firm*—Spencer & Frank

[57] ABSTRACT

To initiate communication, a first station generates a synchronization signal and sends the synchronization signal to a second station. When the second station detects the synchronization signal, the second station acquires synchronization and sends a synchronization-acquisition message back to the first station. The first station now reduces the power of the synchronization signal, while continuing to send the synchronization signal, and also begins sending a modulated data signal. The second station uses the synchronization signal to maintain synchronization for demodulating the data signal.

20 Claims, 3 Drawing Sheets

2

METHOD OF CONTROLLING SYNCHRONIZATION SIGNAL POWER IN A COMMUNICATION SYSTEM

BACKGROUND OF THE INVENTION

The present invention relates to a communication system in which a first station transmits a synchronization signal to a second station, and more particularly relates to a method of controlling the power of the synchronization signal.

The purpose of the synchronization signal is to aid the second station in demodulating a digitally modulated signal which is also transmitted from the first station to the second station. The digitally modulated signal is generated by using a data signal to modulate a carrier signal at the first station. In spread-spectrum communications the carrier signal, or the data signal itself, may also be modulated by a chip code. Demodulation refers to the process or processes used to recover the data signal from the digitally modulated signal.

One typical demodulation process is a so-called detection process in which the digitally modulated signal is multiplied by a replica of the carrier signal. In coherent (synchronous) detection, this replica carrier signal must be matched in both frequency and phase to the incoming carrier signal. Under favorable channel conditions, the second station can extract an accurately-synchronized replica carrier signal from the digitally modulated signal itself. This becomes difficult under adverse conditions, however, such as in a fading multipath channel. Hence, the need for a separate synchronization signal arises.

A synchronization signal may also be employed with non-coherent detection, in which the second station's replica carrier signal is not necessarily matched to the incoming carrier phase. In this case, further measures must be taken to detect and compensate for the phase difference between the two carriers. The synchronization signal provides a way to detect the phase difference.

In a spread-spectrum communication system, demodulation also involves use of the chip code. In this case the synchronization signal can be employed to synchronize the chip codes at the first and second stations.

In one prior art spread-spectrum system, the synchronization signal is itself a chip code signal. The first station generates two different chip codes, which are mutually synchronized. The first chip code is transmitted continuously and repeatedly as the synchronization signal. The second chip code is used to spread the outgoing data signal. The second station detects the first chip code in the arriving signal, and uses it to synchronize its own chip code generator. This chip code generator generates the second chip code, which is used to recover the transmitted data. The first chip code may also be used to obtain a synchronized replica carrier signal for coherent detection.

This prior art system, however, introduces a certain problem. The communication system normally involves many stations in addition to the first station and second station. All of these stations communicate over the same channel, using different chip codes to keep their communications separate. Unfortunately, the different chip codes tend to interfere with one another to some degree. Since the above method doubles the number of chip codes employed, it doubles the amount of interference. This greatly reduces the number of stations that can access the channel simultaneously.

The problem of interference due to synchronization signals is not confined to spread-spectrum communications. Moreover, there is a further problem in that transmission of synchronization signals consumes extra power.

SUMMARY OF THE INVENTION

It is accordingly an object of the present invention to reduce interference caused by transmission of synchronization signals.

Another object of the invention is to enable synchronization signals to be transmitted at an optimal power level.

The invented communication system comprises at least a first station and a second station. To initiate communication between these two stations, the first station generates a synchronization signal and sends it to the second station at a first power level. When the second station detects the synchronization signal, it acquires synchronization and sends a synchronization-acquisition message back to the first station.

The first station now reduces the power of the synchronization signal to a second level, lower than the first level, and continues sending the synchronization signal to the second station at this second power level. The first station also begins sending a modulated data signal to the second station, at a third power level higher than the second power level. The second station uses the synchronization signal to maintain synchronization in demodulating the data signal.

DETAILED DESCRIPTION OF THE INVENTION

A preferred embodiment of the invention will now be described with reference to the attached illustrative drawings.

Figure 1:
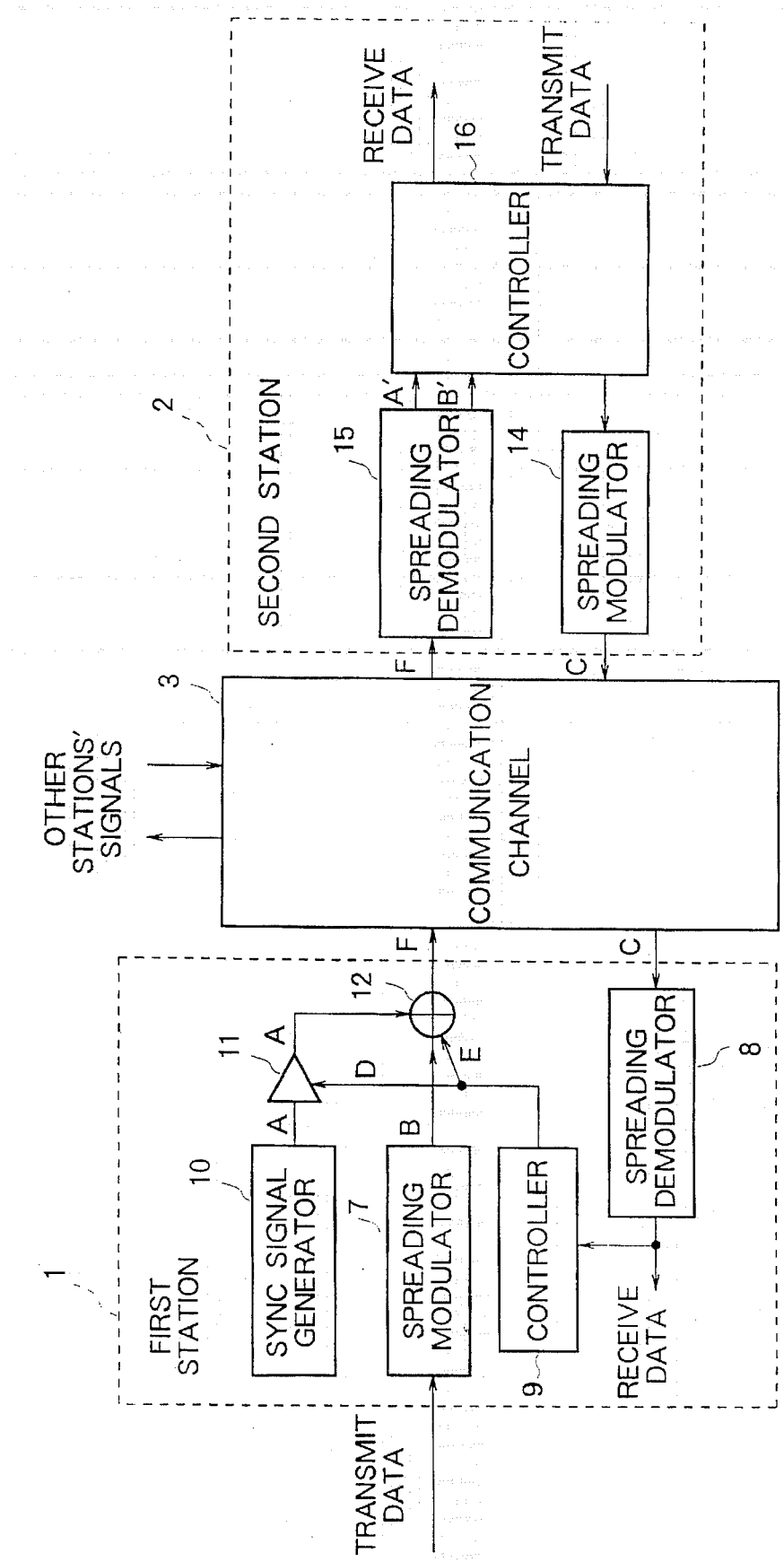
FIG. 1 is a block diagram of the invented communication system.

Referring to FIG. 1, the embodiment comprises a first station 1 and a second station 2 that communicate over a communication channel 3. Other stations, not shown in the drawing, also communicate over the same communication channel 3, using a direct-sequence code-division multiple-access (DS-CDMA) scheme.

The first station 1 and second station 2 may be, for example, a base station and a terminal station in a personal communication system (PCS) or cellular telephone system. The role of the base station may be played by either of the two stations, as will be explained later.

The first station 1 comprises a spreading modulator 7, a spreading demodulator 8, a controller 9, a synchronization-signal generator 10, a variable-gain amplifier 11, and an adder 12. The synchronization-signal generator 10 generates a synchronization signal A which in this embodiment consists of a first chip code. The spreading modulator 7 generates a second chip code and spreads a data signal by this second chip code, producing a spread-modulated data signal B. The first and second chip codes generated at the first station 1 are mutually synchronized. The spreading demodulator 8 generates a third chip code, and despreads an incoming communication signal C from the communication channel 3 by this third chip code to obtain a receive data signal.

The variable-gain amplifier 11 controls the power level of the synchronization signal A, in response to a control signal D from the controller 9. The adder 12 adds the spread-modulated data signal B output from the spreading modulator 7 to the synchronization signal A output from the variable-gain amplifier 11, responsive to a control signal E from the controller 9, and sends the result into the communication channel 3 as an outgoing communication signal F. Communication signals C and F may have different carrier frequencies.

The second station 2 comprises a spreading modulator 14, a spreading demodulator 15, and a controller 16. The spreading demodulator 15 generates replicas of the first and second chip codes, uses them to despread the communication signal F received from the communication channel 3, and supplies resulting signals A' and B' to the controller 16. The controller 16 outputs a receive data signal, inputs a transmit data signal, inserts various messages into the transmit data signal, and supplies it to the spreading modulator 14. The spreading modulator 14 generates the third chip code, uses it to spread this transmit data signal, thereby creating communication signal C, and sends communication signal C into the communication channel 3.

The replicas of the first and second chip codes generated at the second station 2 are synchronized with one another, but are not necessarily synchronized to the first and second chip codes generated at the first station 1. That is, the spreading modulator 7 and synchronization-signal generator 10 in the first station 1 are mutually synchronized, but they are not necessarily synchronized to the spreading demodulator 15 in the second station 2.

In this embodiment, spreading or despreading a signal by a chip code means, for example, that the signal is multiplied by the chip code, and that the chip code takes on a certain pattern of values of plus or minus one at a chip rate higher than the data rate in the signal.

Carrier modulation and demodulation may occur at various places in this system. At the first station 1, the spreading modulator 7 and synchronization-signal generator 10 may, for example, output baseband signals at the chip rate, which modulate a higher-frequency carrier signal after being combined by the adder 12. Alternatively, the spreading modulator 7 and synchronization-signal generator 10 may output intermediate-frequency (IF) signals, by modulating identical IF carriers having a frequency higher than the chip rate. After being combined by the adder 12, these IF signals then modulate a radio-frequency (RF) carrier for transmission on the communication channel 3. In this case, communication signal F is downshifted from the RF to the IF frequency at the second station 2 before being input to the spreading demodulator 15, and coherent detection may take place at the IF level in the spreading demodulator 15, as will be explained later.

To simplify the drawings, modulation and demodulation of carrier signals have not been explicitly indicated, but these processes are well known to those skilled in the art.

Next the general operation of this embodiment will be described with reference to FIGS. 1, 2, and 3.

Figure 2:
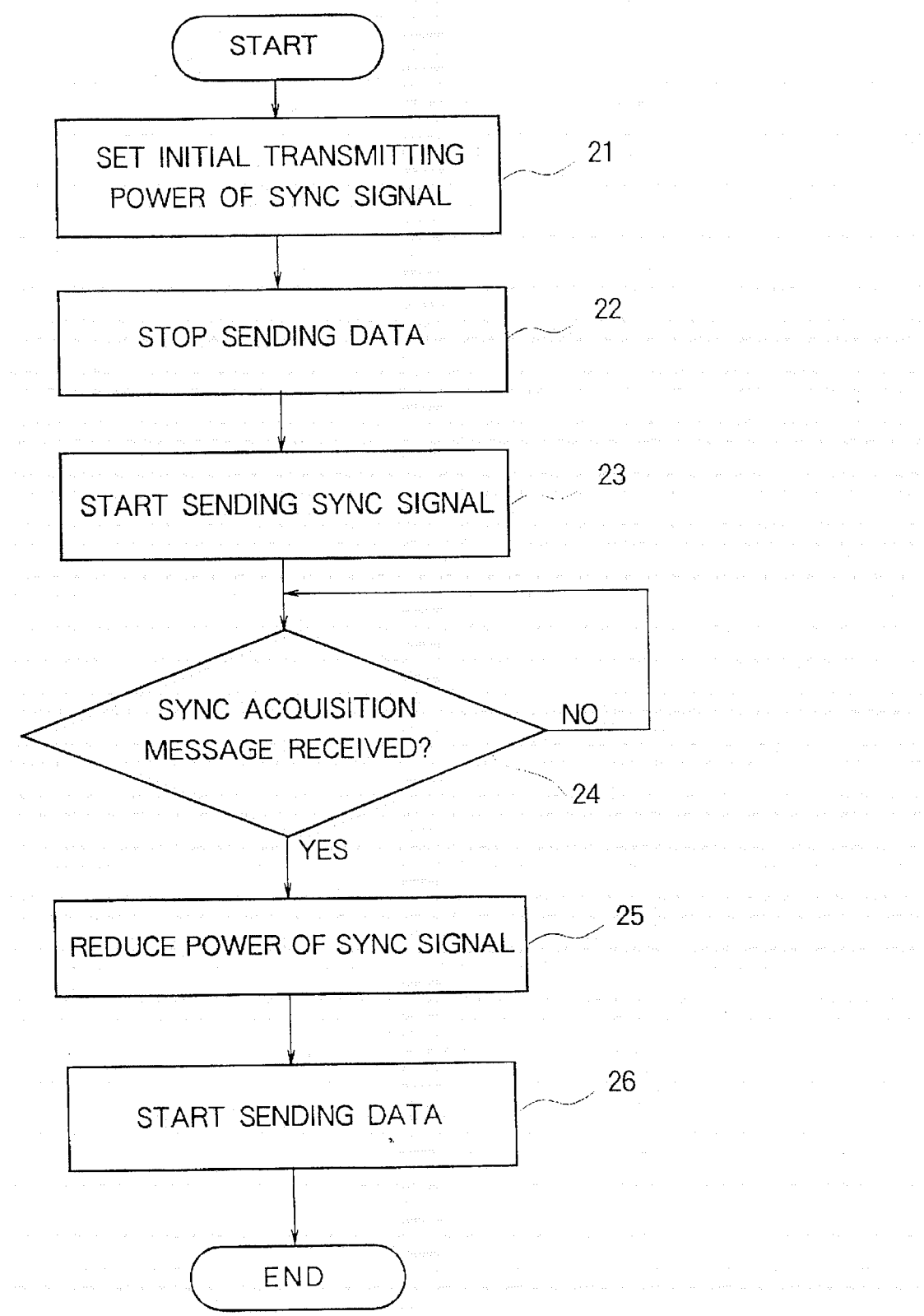
FIG. 2 is a flowchart illustrating operations at the first station.

To initiate communication, the controller 9 in the first station 1 commands the variable-gain amplifier 11, via control signal D, to output the synchronization signal A at an initial first power level (step 21 in FIG. 2). This first power level is preferably high enough that the second station 2 can easily detect the synchronization signal. Via control signal E, the controller 9 also commands the adder 12 not to add the spread-modulated data signal B to the synchronization signal A, thereby halting the sending of data (step 22). The first station 1 thus begins sending a communication signal F consisting of the synchronization signal A alone (step 23).

Figure 3:
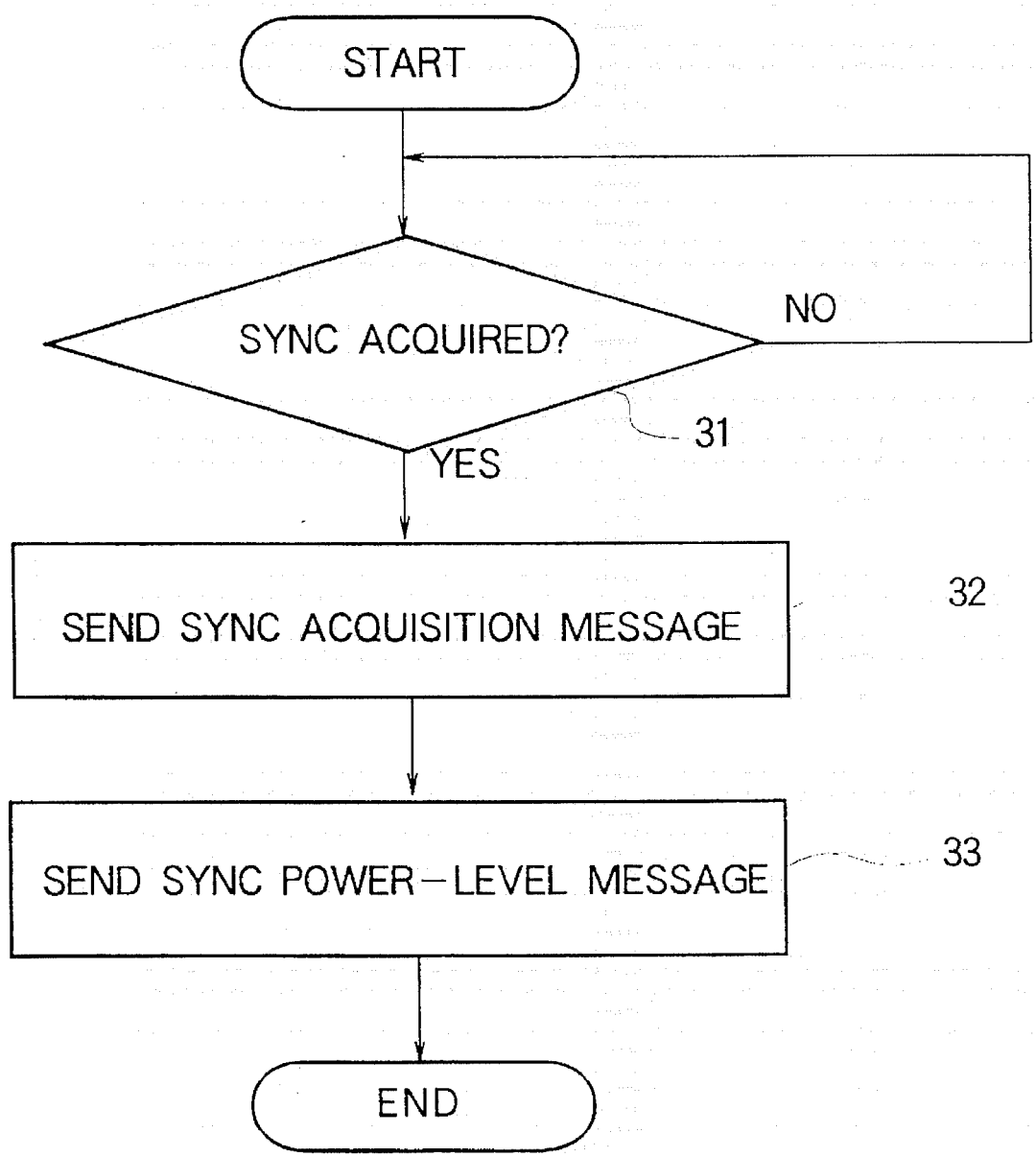
FIG. 3 is a flowchart illustrating operations at the second station.

Referring to FIG. 3, the second station 2 now waits to acquire synchronization (step 31). Specifically, the spreading demodulator 15 generates a replica of the first chip code and uses it to despread communication signal F, thereby obtaining the signal designated A' in FIG. 1. The controller 16 tests signal A' by, for example, integrating it over a certain time interval, obtaining an output level that will be high if the first chip codes at the first and second stations are correctly synchronized, and low if they are not. If the output level is low, the controller 16 commands the spreading demodulator 15 over a signal line not shown in FIG. 1 to advance the timing of its first chip code by a certain amount.

Responding to commands from the controller 16, the spreading demodulator 15 keeps advancing the timing of its first chip code until the controller 16 sees a high output level, thereby detecting the synchronization signal. At this point the spreading demodulator 15 is correctly synchronized with the synchronization-signal generator 10 in the first station; synchronization has thus been acquired. Since the synchronization-signal generator 10 and spreading modulator 7 in the first station 1 are synchronized, the spreading demodulator 15 in the second station 2 is also synchronized to the spreading modulator 7 in the first station 1.

Acquisition of synchronization is facilitated by the absence of spread-modulated data B in the communication signal F, because there is that much less interference with which to contend.

Synchronization of the third spreading codes in the spreading modulator 14 at the second station 2 and spreading demodulator 8 at the first station 1 is acquired in a similar manner using, for example, a second synchronization signal transmitted from the second station 2 to the first station 1, or the third spreading code itself transmitted as the second synchronization signal from the second station 2 to the first station 1.

When synchronization has been acquired in both directions, the controller 16 in the second station 2 generates and sends to the spreading modulator 14 a synchronization-acquisition message (step 32 in FIG. 3). The spreading modulator 14 uses the third chip code to spread the synchronization-acquisition message, which is then transmitted to the first station 1 as part of communication signal C. A synchronization power-level message may also be sent (step 33). As will be described later.

Referring again to FIG. 2, in the first station 1, the spreading demodulator 8 despreads the incoming communication signal C by the third chip code, and the controller 9 monitors the resulting receive data (step 24). When the controller 9 detects the synchronization-acquisition message, it uses control signal D to direct the variable-gain amplifier 11 to reduce the power level of the synchronization signal A (step 25), and control signal E to direct the adder 12 to begin adding in the spread-modulated data signal B output from the spreading modulator 7 (step 26). The synchronization signal A is reduced to a lower power level than the power level of the spread-modulated data signal B. Communication signal F now consists of both the spread-modulated data signal B and the reduced-power synchronization signal A.

At the second station 2, the spreading demodulator 15 continues to despread the received communication signal F by the first chip code to generate signal A', and the controller 16 continues to monitor signal A'. By using various well-known techniques (such as a delay-locked loop or tau dithering), the controller 16 can detect changes in the propagation delay on the communication channel 3 and keep the spreading demodulator 15 correctly synchronized, despite channel fading.

The spreading demodulator 15 also despreads communication signal F by the second chip code to generate the signal designated B' in the diagram. Since the spreading demodulator 15 is in synchronization with the spreading modulator 7 in the first station 1, this demodulated data signal B' is substantially identical to the transmit data signal originally input to the spreading modulator 7, and is output by the controller 16 as a receive data signal.

The transmitted and received data will not in general be exactly identical, because of interference from signals belonging to other stations. If the second station 2 has the role of the base station in the communication system, these other stations communicate with the second station 2, using the same synchronization method as the first station 1. That is, each of these other stations sends the second station 2 a synchronization signal as well as a spread-modulated data signal, and the second station 2 synchronizes with each of these other stations separately. The advantage of the invention is that, except during the initial synchronization-acquisition phase, these synchronization signals are all transmitted at a reduced power level, so they cause comparatively little interference.

If the first station 1 has the role of base station, it communicates with the other stations, and can transmit the same synchronization signal A to all of them. In this case the synchronization signal A will only need to be transmitted at the first power level occasionally, namely when necessary to enable a new station to acquire synchronization. At other times, the power level of the synchronization signal A is reduced. The average amount of interference due to the synchronization signal A is reduced accordingly.

In either case, by reducing interference, the invention improves receiving performance at the second station and therefore increases the number of stations that can communicate simultaneously.

A further advantage of the invention is that reducing the power of the synchronization signal saves power at the first station 1. If the first station 1 is battery-powered, this power saving means extended extends battery life.

Next, some variations of the above embodiment will be described.

In a first variation, from signal A', the controller 16 also generates a replica carrier signal for use in coherent detection. Coherent detection is performed, for example, by the spreading demodulator 15, which receives communication signal F at an intermediate frequency (IF) and demodulates it to the baseband (chip rate) frequency, as well as despreading it with the first and second chip codes. The replica carrier signal needed for coherent detection at the IF level is provided from the controller 16 to the spreading demodulator 15 by a signal line not shown in the drawing.

In a second variation, the signal A' itself is used as a replica carrier signal for coherent detection, in the spreading demodulator 15 or elsewhere. To obtain the signal A' in this case, the spreading demodulator first despreads communication signal F with the replica first chip code, then filters the resulting signal to isolate the carrier frequency.

In a third variation, non-coherent detection is employed. The controller 16 uses signal A' to detect the phase rotation of the demodulated data signal B' and compensates by performing an opposite phase rotation.

Regardless of whether coherent or non-coherent detection is employed, the presence of a synchronization signal A of known content in the communication signal F greatly assists the second station 2 in detecting and dealing with changes in propagation delay on the communication channel 3.

In a fourth variation, interference due to the synchronization signal A is further reduced by transmitting the synchronization signal A only intermittently after synchronization has been acquired. That is, the controller 9 commands the variable-gain amplifier 11 to alternate between sending the synchronization signal A at the reduced second power level and shutting the synchronization signal A off completely. This may be done according to a regular rule known to the controller 16 in the second station 2, so that controller 16 will not assume that synchronization has been lost when synchronization signal A is shut off.

An example of a simple rule would be to transmit the synchronization signal A for one complete cycle of the first chip code, and then shut it off for one complete cycle of the first chip code. More generally, the synchronization signal A can alternate between being transmitted for intervals of a first fixed length and shut off for intervals of a second fixed length. Alternatively, the lengths of these intervals may be varied, according to the time of day for example. The synchronization signal may also be shut off in response to a voice detector that, for example, detects non-speaking intervals in a telephone conversation.

During intervals when the synchronization signal is shut off, synchronization is maintained by accurate oscillators at the first and second stations. The maximum allowable shut-off interval of the synchronization signal depends on the stability of these oscillators, and on the rate at which the propagation delay on the communication channel 3 changes.

In a fifth variation, the first station 1 has the role of base station in the communication system, and keeps track of the number of stations with which it is communicating. When the controller 9 commands the variable-gain amplifier 11 to set the transmitting power of the synchronization signal A to a certain level, controller 9 determines this level from the number of stations currently communicating. For example, controller 9 can conserve power and minimize interference by selecting the minimum power level necessary to ensure detection of the synchronization signal A at all communicating stations. In general, this minimum level will increase as the number of communication stations increases and the general interference level rises.

In a sixth variation, the second station 2 has the role of base station and keeps track of the number of communicating stations. Referring again to FIG. 3, when the controller 16 sends the first station 1 a synchronization-acquisition message, together with this message it also sends a synchronization power-level message (step 33), designating the power level at which the first station 1 is to transmit synchronization signal A. As in the preceding variation, this power level is determined from the number of stations currently communicating. The controller 9 in the first station 1 instructs the variable-gain amplifier 11 to adjust its output power to the designated level.

The number of communicating stations may be variable. As this number changes from time to time, if the first station 1 is the base station, it can respond by raising or lowering the power level of its single synchronization signal A accordingly. If the second station 2 is the base station, it can respond by sending synchronization power-level messages to all communicating stations, instructing them to raise or lower the power levels of their separate synchronization signals. One strategy in this second case would be to have the synchronization-signal power level reduced as the number of communicating stations increases, to keep total interference within acceptable bounds.

In a seventh variation, the communication system employs a frequency-hopping scheme (FH-CDMA) instead of direct-sequence CDMA, so that the transmit data signal is hopped, instead of spread, at the first station 1, and dehopped, instead of despread, at the second station 2. The synchronization signal in this case is, for example, a constant-valued signal transmitted at a known frequency-hopping pattern. As in the direct-sequence case, the power of the synchronization signal is reduced as soon as synchronization is acquired.

In an eighth variation, direct-sequence and frequency-hopping CDMA are employed in combination. The power of the synchronization signal is reduced when synchronization with both the frequency-hopping pattern and direct-sequence chip code is acquired.

In a ninth variation, the communication system is any type of system employing a digital modulation scheme, and the synchronization signal is employed not for code synchronization but for coherent detection, or for phase compensation after non-coherent detection. The synchronization signal in this case is, for example, an unmodulated clock or carrier signal. Relevant examples of digital modulation schemes include binary phase-shift keying (BPSK), quaternary phase-shift keying (QPSK), and differential phase-shift keying (DPSK).

Although mention has been made of a radio-frequency carrier, practice of the invention is not restricted to wireless radio communications. It can also be usefully applied in wire-line electrical communications, or in optical or acoustic communications.

The first station and second station may both be fixed, or both mobile, or either one may be fixed and the other mobile. Examples of mobile stations include cordless telephone sets, automobile telephones, ships, airplanes, and artificial earth satellites.

Those skilled in the art will recognize that still further modifications are possible without departing from the scope claimed below.

What is claimed is:

1. A method of synchronizing a first station to a second station in a communication system, comprising the steps of:
   (a) generating a synchronization signal at said first station;
   (b) sending said synchronization signal from said first station to said second station at a first power level;
   (c) detecting said synchronization signal at said second station and acquiring synchronization therewith;
   (d) sending a synchronization-acquisition message from said second station to said first station;
   (e) reducing said synchronization signal to a second power level lower than said first power level;
   (f) generating, at said first station, a modulated data signal, said modulated data signal being modulated in synchronization with said synchronization signal;
   (g) sending both said synchronization signal and said modulated data signal from said first station to said second station, said synchronization signal being at said second power level and said modulated data signal being at a power level higher than said second power level; and
   (h) demodulating said modulated data signal at said second station, in synchronization with said synchronization signal.

2. The method of claim 1, wherein said synchronization signal is a first chip code signal.

3. The method of claim 1, comprising the further steps of:
   generating a second chip code signal at said first station, in synchronization with said synchronization signal; and
   generating a replica of said second chip code signal at said second station, in synchronization with said synchronization signal; wherein
   said step (f) comprises spreading a data signal by said second chip code signal; and
   said step (h) comprises despreading said modulated data signal by said replica of said second chip code signal.

4. The method of claim 1, wherein said first station communicates simultaneously with a variable number of stations, one of which is said second station, and determines said second power level by counting said number of stations.

5. The method of claim 1, comprising the further step of:
   sending a synchronization power-level message from said second station to said first station after said step (c) but before said step (e), wherein the second power level of said step (e) is designated in said synchronization power-level message.

6. The method of claim 5, wherein said second station communicates simultaneously with a variable number of stations, one of which is said first station, and determines said second power level by counting said number of stations.

7. The method of claim 5, wherein said synchronization power-level message is sent together with said synchronization-acquisition message.

8. The method of claim 1, wherein when said synchronization signal is sent continuously in said step (g).

9. The method of claim 1, wherein when said synchronization signal is sent intermittently in said step (g).

10. The method of claim 1, wherein said synchronization signal is used for coherent detection of said modulated data signal at said second station.

11. A system for communication between a first station and a second station, comprising:
   a synchronization-signal generator disposed in said first station, for generating a synchronization signal;
   a variable-gain amplifier coupled to said synchronization-signal generator, for outputting said synchronization signal at a power level responsive to a first control signal;
   an adder coupled to said variable-gain amplifier, for adding a data signal to the synchronization signal output by said variable-gain amplifier, responsive to a second control signal, to create a first communication signal;
   a communication channel for transmitting said first communication signal from said first station to said second station, and for transmitting a second communication signal from said second station to said first station;
   a first controller coupled to said variable-gain amplifier, for detecting a synchronization-acquisition message in said second communication signal, and for generating said first control signal and said second control signal responsive to said synchronization-acquisition message; and
   a second controller disposed in said second station, for detecting said synchronization signal in said first communication signal, and for generating said synchronization-acquisition message.

12. The system of claim 11, wherein:
   using said first control signal, said first controller directs said variable-gain amplifier to reduce the power level of said synchronization signal when said synchronization-acquisition message has been received; and using said second control signal, said first controller directs said adder to add said data signal to said synchronization signal after said synchronization-acquisition message has been received, but not to add said data signal to said synchronization signal before said synchronization-acquisition message has been received.

13. The system of claim 12, wherein after said synchronization-acquisition message is received, said first controller directs said variable-gain amplifier to reduce the power level of said synchronization signal to a level such that said synchronization signal is transmitted at a lower power level than said data signal.

14. The system of claim 13, wherein said second controller inserts a synchronization power-level message into said second communication signal instructing said first controller how far to reduce the power level of said synchronization signal.

15. The system of claim 14, wherein said second station communicates with a variable number of stations, one of which is said first station, and said second controller determines the power level of said synchronization signal according to said number of stations.

16. The system of claim 11, wherein said first station communicates with a variable number of stations, one of which is said second station, and said first controller determines the power level of said synchronization signal according to said number of stations.

17. The system of claim 11, wherein said synchronization signal is a first chip code signal.

18. The system of claim 11, also comprising:

a spreading modulator coupled to said adder, for spreading said data signal by a second chip code signal synchronized to said synchronization signal; and a spreading demodulator coupled to said second controller, for despreading said first communication signal by a replica of said second chip code signal synchronized to said synchronization signal.

19. The system of claim 11, wherein after detecting said synchronization-acquisition message, said first controller directs said variable-gain amplifier to provide said synchronization signal to said adder at intermittent intervals.

20. The system of claim 11, wherein said synchronization signal is used for coherent detection of said first communication signal at said second station.

* * * * *